Dec. 11, 1956  D. E. BECKETT ET AL  2,773,508
OSCILLATOR VALVE

Filed April 28, 1953  2 Sheets-Sheet 1

INVENTORS
DONALD E. BECKETT
WILLIAM N. BECKETT
WAYNE T. CRANNELL
BY
J. Warren Kinney, Jr.
ATTORNEY

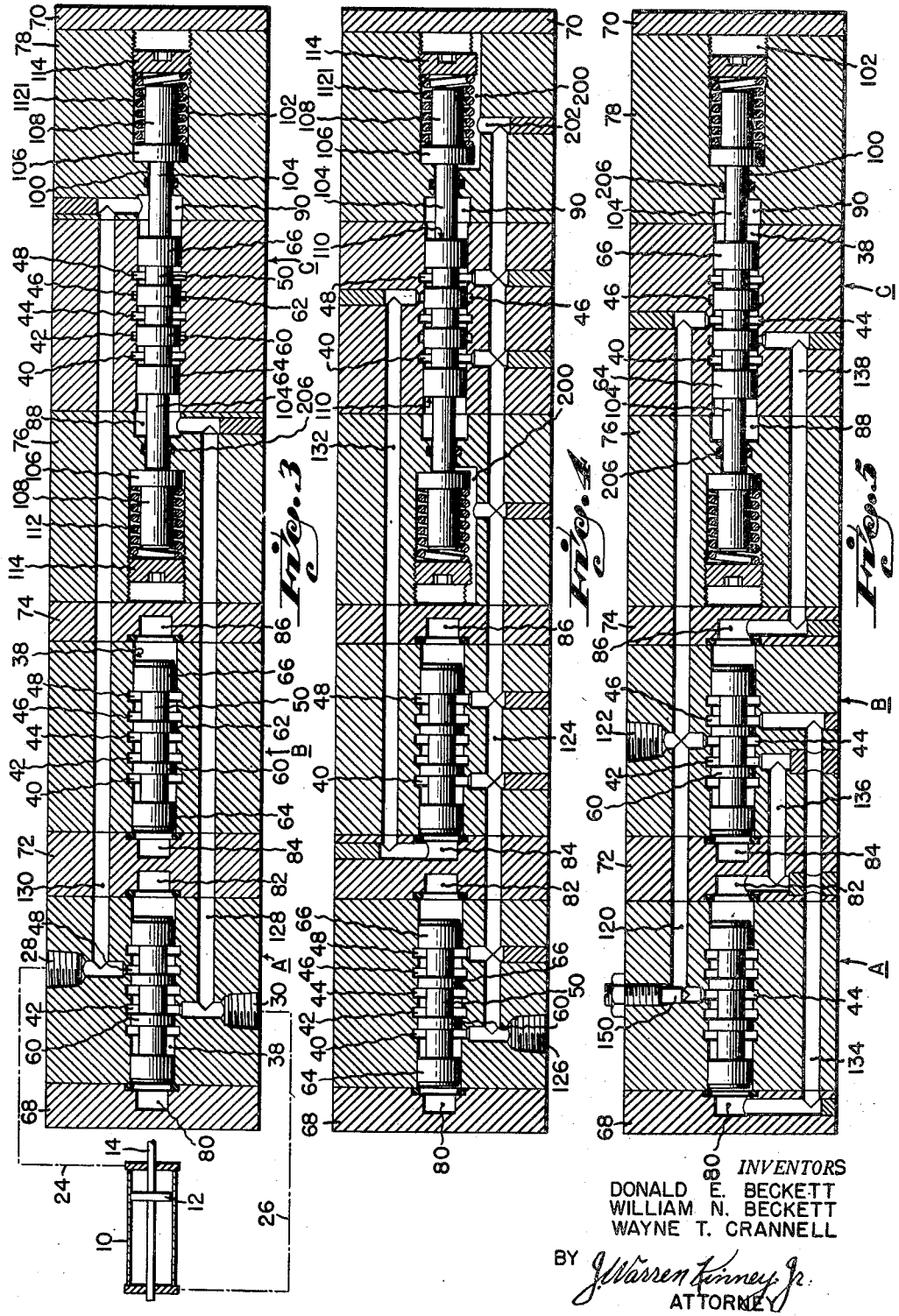

United States Patent Office 2,773,508
Patented Dec. 11, 1956

2,773,508

OSCILLATOR VALVE

Donald E. Beckett and William N. Beckett, Wilmington, and Wayne T. Crannell, Dayton, Ohio, assignors to Beckett-Harcum Co., Wilmington, Ohio, a corporation of Ohio Application April 28, 1953, Serial No. 351,556

10 Claims. (Cl. 137—106)

This invention relates to a self-contained oscillator valve.

An object of the invention is to provide simple, foolproof and highly effective means for automatically reversing the flow of actuating fluid to a work cylinder without requiring the use of mechanical valve-reversing mechanisms.

Another object of the invention is to provide a valve having the hereinabove described characteristics which is composed of three duplicate spool valves the individual spools of which are interlocked by the actuating fluid being controlled thereby.

A further object of the invention is to provide an oscillator valve which is so constructed and arranged that it will automatically reverse the flow of actuating fluid to a cylinder controlled thereby incident to pressure changes occurring within the valve by reason of pressure conditions existing within the cylinder being controlled by the valve.

Still a further object of the invention is to provide a compact, self-contained oscillator valve having the hereinabove described characteristics, which includes an inlet port and an outlet port for hydraulic fluid under pressure, and a pair of cylinder ports, one for opposite ends of a cylinder whose operating characteristics are controlled by the valve.

These and other objects are attained by the means described herein and as disclosed in the accompanying drawing, in which:

Fig. 3 is a sectional view taken on line 3—3 of Fig. 2.

Fig. 4 is a sectional view taken on line 4—4 of Fig. 2.

Fig. 5 is a sectional view taken on lines 5—5 of Fig. 2.

Figure 1:
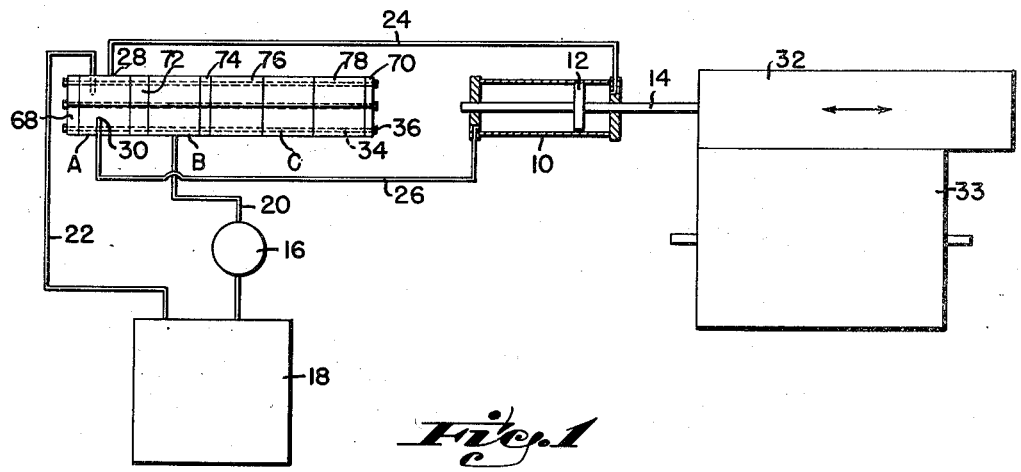
Fig. 1 is a diagrammatic view of a closed hydraulic system including an oscillatory valve embodying the teachings of the present invention.

With particular reference now to Fig. 1, the numeral 10 denotes generally a cylinder having a piston 12 mounted for reciprocation therein for imparting reciprocatory motion to shaft 14. In the preferred embodiment of the invention the internal areas of the cylinder on opposite faces of piston 12 are equal. The numeral 16 denotes a pump for providing fluid under pressure from sump 18 to pressure or intake line 20, whereas the numeral 22 denotes an exhaust or return line from the exhaust port of the valve to sump 18. Hydraulic fluid under pressure is alternately fed to opposite ends of the cylinder via conduits 24 and 26 which are connected to and in open communication with cylinder ports 28 and 30, respectively, of the oscillator valve.

One use to which the oscillator valve of the present invention may be put is to impart endwise reciprocatory motion to the doctor blade 32 associated with roll 33 of a paper making machine, however such relationship is exemplary in nature rather than restrictive.

Figure 2:
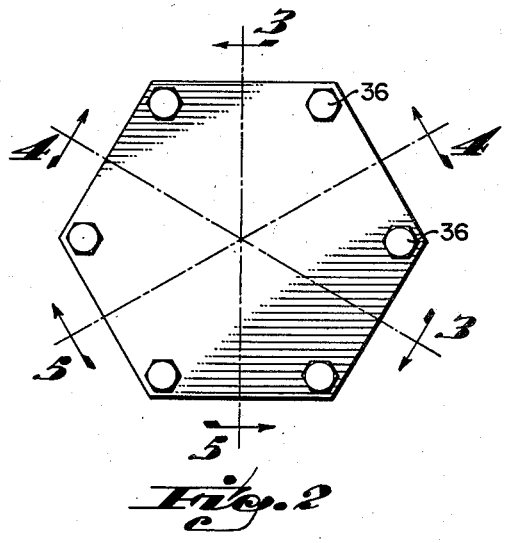
Fig. 2 is an end view of the oscillator valve.

With reference now to Figs. 3, 4 and 5, it will be noted that the valve comprises three duplicate spool valves which are mounted in laterally spaced, end-to-end or axial relationship by means of a plurality of through bolts or tie rods 34 to the ends of which nuts 36 are provided, note Figs. 1 and 2. For ease of understanding, the three duplicate spool valves will be denoted by the letters A, B and C, thereby indicating the first, second and third of such valves.

Each of valves A, B and C, includes a longitudinal axial bore 38 having five annular ports 40, 42, 44, 46 and 48 disposed along and in open communication with the bore, wherein the numeral 40 denotes what will hereinafter be referred to as the first annular port, the numeral 42 the second annular port, the numeral 44 the third annular port, the numeral 46 the fourth annular port, and the numeral 48 the fifth annular port, the same numerals being utilized to designate similar annular ports of each of the duplicate valves A, B and C.

Each spool valve includes a valve stem 50 reciprocably mounted within axial bore 38, the stem including a pair of laterally spaced valving pistons 60 and 62 for opening and closing the second and fourth of said annular ports, 42 and 46, said valve stem likewise including a second pair of pistons 64 and 66, one on either side of the first pair of pistons 60 and 62 and beyond the first and fifth annular ports, 40 and 48.

End plates 68 and 70 are provided at opposite ends of the oscillator valve assembly. A spacer plate 72 is provided between the adjacent ends of valves A and B, spacer plates 74 and 76 between adjacent ends of valves B and C, and spacer plate 78 is provided between the other end of valve C and end plate 70.

Individual ports are provided at opposite ends of bore 38 of each valve, said ports being in open communication with the respective outer faces of the second pair of pistons 64 and 66 of each of said valves. As best illustrated in Figs. 3, 4 and 5, these ports are denoted by the numerals 80, 82, 84, 86, 88 and 90, wherein port 80 is provided in end plate 68 in axial alignment with bore 38 of valve A and in open communication with the end face of piston 64. Ports 82 and 84 are provided in opposite faces of spacer plate 72, wherein port 82 is in open communication with the end face of piston 66 of valve A, port 84 being in open communication with end face of piston 64 of valve B. Port 86 is provided in spacer plate 74 in open communication with the end face of piston 66 of valve B. Port 88 is provided in spacer plate 76 in open communication with the end face of piston 64 of valve C, and port 90 is provided in spacer plate 78 in open communication with the end face of piston 66 of valve C.

With particular reference now to spacer plates 76 and 78, it will be noted that an axial bore extends axially of and lengthwise through these plates and in alignment with their respective ports 88 and 90. These axial bores each comprise a narrow portion 100 and an enlarged portion 102, wherein the narrow portion 100 is dimensioned to slidably receive shaft 104 projecting outwardly from annular collar 106 which is disposed intermediate portion 104 and a rearward or stub shaft portion 108.

The free forward end 110 of each of shafts 104 is adapted to abuttingly engage the end or outer face of pistons 64 and 66, respectively, of valve C, said shafts being normally urged toward the stem of valve C by means of compression springs 112 and 1121. Preferably, though not necessarily, a threaded plug 114 may be associated with enlarged bore 102 for facilitating adjustment of the compression of springs. The purpose of springs 112 and 1121 is to normally and yieldably exert a centering effect on valve stem 50 of valve C for disposing valving pistons 60 and 62 in blocking relationship with the second and fourth annular ports 42 and 46 of valve C.

Valve A is provided with a pair of cylinder ports 28 and 30, wherein port 28 is in open communication with the fourth annular port, 46, and cylinder port 30 is in open communication with the second annular port, 42. As illustrated in Fig. 1, cylinder ports 28 and 30 are connected, in a closed circuit, to opposite ends of cylinder 10 by means of suitable fluid conduits indicated schematically by dot and dash lines 24 and 26, respectively.

As best illustrated in Fig. 5, the third annular port, 44, of each of valves A, B, and C, is interconnected to and by means of a common manifold 120, said manifold being in open communication with inlet port 122 provided through the housing of valve B.

As best illustrated in Fig. 4, the first and fifth annular ports, 40 and 48, of each of valves A, B and C, are interconnected to and by means of manifold 124, said manifold being in open communication with exhaust port 126 provided through the housing of valve A.

In the preferred embodiment of the invention, a drain or by-pass channel 200 is provided throughout the length of enlarged portions 102 and in open communication with exhaust manifold 124 via bores 202. In this manner any fluid which may pass beyond packing rings 206 which engage rod portions 104 will be returned to the exhaust manifold.

The second annular port, 42, of valve A, is connected with port 88 adjacent and in communication with the end face of piston 64 of valve C by means of passageway 128, note Fig. 3. The fourth annular port, 46, of the first valve is connected with port 90 in spacer plate 78 by means of passageway 130, whereby the pressure of cylinder port 28 will be transmitted to port 90 of valve C and wherein the pressure of cylinder port 30 will be transmitted to port 88 at the other end of valve C.

With reference now to Fig. 4, it will be noted that end port 84 is connected, by means of passageway 132, with the fourth annular port, 46, of valve C. Port 80, note Fig. 5, is connected by means of passageway 134 with the fourth annular port, 46, of valve B, and port 82 is connected by passageway 136 with the second annular port, 42, of valve B. Port 86 is connected by passageway 138 with the second annular port, 42, of valve C.

It should be understood that the various valves A, B and C, and their associated end plates and spacer plates, are secured in axial alignment whereby to provide a fluid-tight assembly. Preferably suitable gaskets, such as, by way of example, O-rings, may be utilized, as clearly illustrated in the drawings and as is common practice in the art.

If it now be assumed that the valve has been connected, in a closed hydraulic circuit, with the cylinder 10, such as, by way of example, the hydraulic circuit as illustrated in Fig. 1, the valve will automatically and continuously reverse the direction of stroke of piston 12 of the cylinder so long as a supply of fluid under pressure is provided.

Briefly, the operating characteristics of the valve are as follows: Fluid, under pressure, entering inlet port 122 will be distributed to the third annular port, 44, of each of valves A, B and C. Valve pistons 60 and 62 of valve C, note Fig. 5, being centered, block the second and fourth annular ports 42 and 46, respectively.

At valve B the fluid under pressure will pass from the third annular port 44 into the second annular port 42, thence through passageway 136 into port 82 in open communication with the end face of piston 66 of valve A, thereby shifting valve stem 50 to the left whereby valving piston 60 of valve A will be moved to the left for uncovering the second annular port 42, for thereby establishing a flow of fluid under pressure through cylinder port 30 into one end of cylinder 10 for thereby shifting piston 12 to the right. When the piston 12 has reached the end of its stroke, a pressure build-up will occur in cylinder 10 and in passageway 128 and port 88 sufficient to overcome the counter-force of spring 1121 whereby valve stem 50 of valve C will be shifted to the right and valving piston 62 of valve C will uncover the fourth annular port 46, for interconnecting it in open communication with port 84 via passageway 132, the pressure of the fluid within port 84 will shift valve stem 50 of valve B to the right for interconnecting the third and fourth annular ports 44 and 46 of valve B in open communication with passageway 134 and port 80 of valve A. The pressure thus established in port 80 will shift stem 50 of valve A to the right for thereby placing the third and fourth annular ports 44 and 46 in open communication with cylinder port 28, whereby fluid under pressure will be introduced via conduit 24 into the other end of cylinder 10 for thereby shifting piston 12 to the left.

The pressure existing in port 90 will not be sufficient to overcome the counter-force of spring 112 until such time as piston 12 has reached the left end of its stroke, at which time the full line pressure will be transmitted to port 90 for shifting valve stem 50 of valve C to the left, thereby interconnecting the second and third annular ports 42 and 44 of valve C with passageway 138 and port 86 in open communication with the end of piston 66 of valve B, thereby initiating another cycle.

From the foregoing it will be noted that the reciprocable valve stems 50 of each of the spool valves A, B and C are hydraulically interlocked at all times and that their operating characteristics are positive and dependable, requiring no mechanical linkages or levers.

In the preferred embodiment of the invention needle valve 150 is suitably associated with the intake port to the third annular valve 44 of valve A for thereby enabling the operator of the device to accurately regulate the operating characteristics of cylinder 10.

The oscillator valve of the present invention is highly compact and will give many years of trouble-free service, said valve being capable of efficient operation whether placed in horizontal, vertical or any other position.

It should be understood that various changes may be made in the structural details of the device, within the scope of the appended claims, without departing from the spirit of the invention.

What is claimed is:

1. An oscillator valve comprising the combination of three duplicate spool valves each including a housing having a longitudinal bore therethrough, five annular ports in laterally spaced relationship disposed along and in open communication with said bore, a valve stem reciprocably mounted in said bore, said stem including a pair of valving pistons for opening and closing the second and fourth of said annular ports, and a second pair of pistons one on either side of said first pair of pistons and beyond the first and fifth annular ports, with means for mounting said valves in laterally spaced end-to-end relationship and providing an individual chamber for each valve with individual ports at opposite ends of the bore of each valve and in open communication with the respective outer faces of the second pair of pistons of each of said valves, means interconnecting the third annular ports of each valve to a common manifold, means interconnecting the first and fifth annular ports of each valve to a second common manifold, the second and fourth annular ports of the first of said three valves terminating in individual cylinder ports provided in their respective valve housing, means interconnecting the second annular port of the first valve with the port at the end of the third valve adjacent the first valve, means inter-connecting the fourth annular port of the first valve with the end port of the third valve remote from the first valve, means inter-connecting the port at the end of second valve adjacent the first valve with the fourth annular port of the third valve, means inter-connecting the port at the end of the first valve remote from the second valve to the fourth annular port of the second valve, means inter-connecting the port at the opposite end of the first valve with the second annular port of the second valve, means inter-connecting the port at the end of the second valve adjacent the third valve in communication with the second annular port of the third valve, and means engaging opposite ends of the stem of the third valve for normally and yieldably urging said stem to a central position with its valving pistons closing the second and fourth annular ports thereof.

2. An oscillator valve as set forth and described in claim 1 wherein the means for mounting the valves in end-to-end relationship includes spacer plates at and between opposite ends of each of said duplicate valves, said spacer plates having provided therein the said individual ports at opposite ends of the bore of each of said valves, and an end plate for the first of said valves, said end plate having an individual port therein in open communication with that end of the reciprocable valve stem of the first valve remote from the other two valves.

3. An oscillator valve as set forth and described in claim 1 wherein an inlet port for fluid under pressure is provided in open communication with the first mentioned common manifold, and wherein a fluid exhaust port is in open communication with the said second common manifold.

4. An oscillator valve comprising the combination of three spool valves each of which includes an axially shiftable stem, the first of said valves including two annular ports, one for each of two individual cylinder ports, the valve stem of the first valve including a pair of valving pistons for selectively directing fluid under pressure to one or the other of said annular ports, the second of said valves including two annular ports one for and in open communication with each opposite end of the valve stem of the first valve, the valve stem of said second valve including a pair of valving pistons for selectively directing fluid under pressure to one or the other ends of the valve stem of the first valve for shifting said stem to one or the other ends of its stroke, the third of said valves including two annular ports one for and in open communication with each opposite end of the valve stem of the second valve, the valve stem of the third valve including a pair of valving pistons for selectively directing fluid under pressure to one or the other or neither of the ends of the valve stem of the second valve, means at opposite ends of the stem of the third valve for normally and yieldably urging said stem to a centered position with its valving pistons closing both of its said annular ports, and a port for and in open communication with each end of the valve stem of the third valve, one of said ports in open communication with one of the two annular ports of the first valve, the second of said ports in open communication with the other annular port of the first valve for selectively applying the fluid pressure existing within the aforesaid annular ports of the first valve against one or the other ends of the valve stem of the third valve and against the counterforce of the said stem centering means.

5. An oscillator valve comprising the combination of three spool valves each of which includes an axially shiftable stem having at least two valving pistons and at least three annular ports controlled thereby, a common inlet for fluid under pressure in open communication with the second of the three annular ports of each valve, the first and third annular ports of the first valve in open communication with individual cylinder ports, the valving piston of the first valve selectively directing fluid under pressure from the second annular port to one or the other of the first and third annular ports, the first and third annular ports of the second valve in open communication with an opposite end of the valve stem of the first valve, the valving pistons of the second valve selectively directing fluid under pressure from the second annular port to one or the other ends of the valve stem of the first valve for shifting said stem to one or the other ends of its stroke, the first and third annular ports of the third valve in open communication with an opposite end of the valve stem of the second valve, the valving pistons of the third valve selectively directing fluid under pressure from the second annular port to one or the other or neither of the ends of the valve stem of the second valve, means at and engaging opposite ends of the stem of the third valve for normally and yieldably urging said stem to a centered position with its valving pistons closing its first and third annular ports, and a port for and in open communication with each end of the valve stem of the third valve, one of said ports in open communication with one of the individual cylinder ports of the first valve, the second of said ports in open communication with the other individual cylinder port of the first valve whereby the pressure conditions existing within the said cylinder ports is utilized to actuate the valve stem of the third valve against a predetermined, centering counterforce, thereby precluding premature, accidental or unintentional actuation of the valve stem of the first valve for altering the flow of fluid from one of the said cylinder ports to the other.

6. A self-contained, fully automatic oscillator valve for reversing the stroke of the piston of a cylinder actuated by a source of fluid under pressure, said valve including a pair of cylinder ports, one for each end of a cylinder controlled by the valve, a first spool valve having a reciprocable valving stem for alternately directing a flow of fluid under pressure to one or the other of the cylinder ports, a second spool valve including an inlet port for fluid media under pressure and having a reciprocable valving stem for directing a flow of fluid under pressure to one or the other of the ends of the valving stem of the first valve for shifting the stem thereof to alternate the flow of pressure media to the cylinder, a third spool valve having a reciprocable valving stem for directing a flow of fluid under pressure to one or the other of the ends of the valving stem of the second valve for shifting the stem thereof to alternate the flow of pressure media to the ends of the valving stem of the first valve, and, means interconnecting opposite ends of the valving stem of the third spool valve in open communication with the said cylinder ports for directing the back pressure existing within one or the other of the cylinder ports when the piston of the cylinder being controlled has reached the end of a stroke to one or the other of the ends of the last mentioned valving stem for shifting said stem to successively shift the valving stems of the first and second spool valves for reversing the flow of pressure media to the cylinder.

7. A self-contained, fully automatic oscillator valve for alternately reversing the stroke of the piston of a cylinder actuated by a source of fluid under pressure, said valve having a fluid inlet port, an exhaust port and a pair of cylinder ports, one for each end of a cylinder controlled by the valve, said valve comprising three spool valves each including a reciprocable valving stem, means interconnecting the opposite ends of the valving stem of one spool in open communication with the said cylinder ports for shifting said valving stem for directing a flow of pressure media from the inlet port to one or the other of the ends of the valving stem of the second spool valve for shifting the stem thereof to alternate the flow of pressure media from the inlet port to the ends of the valving stem of the third spool valve for shifting the stem thereof to alternate the flow of pressure media from the inlet port to one or the other of the cylinder ports.

8. An oscillator valve as set forth in claim 7 wherein the first of said valves includes two annular ports, one for each of said individual cylinder ports, and the valve stem of the first valve includes a pair of valving pistons for selectively directing fluid under pressure to one or the other of said annular ports, and the second of said valves including two annular ports one for and in open communication with each end of the valve stem of the first valve, and the third of said valves including two annular ports one for and in open communication with each opposite end of the valve stem of the second valve, and the valve stem of the third valve including a pair of valving pistons for selectively directing fluid under pressure to one or the other or neither of the ends of the valve stem of the second valve.

9. An oscillator valve as set forth in claim 8 wherein the valve stem of said second valve includes a pair of valving pistons for selectively directing fluid under pressure to one or the other of the ends of the valve stem of the first valve for shifting said stem to one or the other of the ends of its stroke.

10. An oscillator valve as set forth in claim 8 wherein the stem of the third valve has means at opposite ends thereof for normally and yieldingly urging said stem to a centered position with its valving pistons closing both of its annular ports.

References Cited in the file of this patent
UNITED STATES PATENTS 2,386,184   Balsiger _____ Oct. 9, 1945